Dec. 1, 1936.  F. W. PLUMB  2,062,999
MEANS FOR PRODUCING NOVEL KNITTED DOUBLE-FACED ELASTIC FABRICS
Filed July 28, 1933   14 Sheets-Sheet 1

INVENTOR:
Frederic W. Plumb,
BY Alfred E. Ischinger
ATTORNEY.

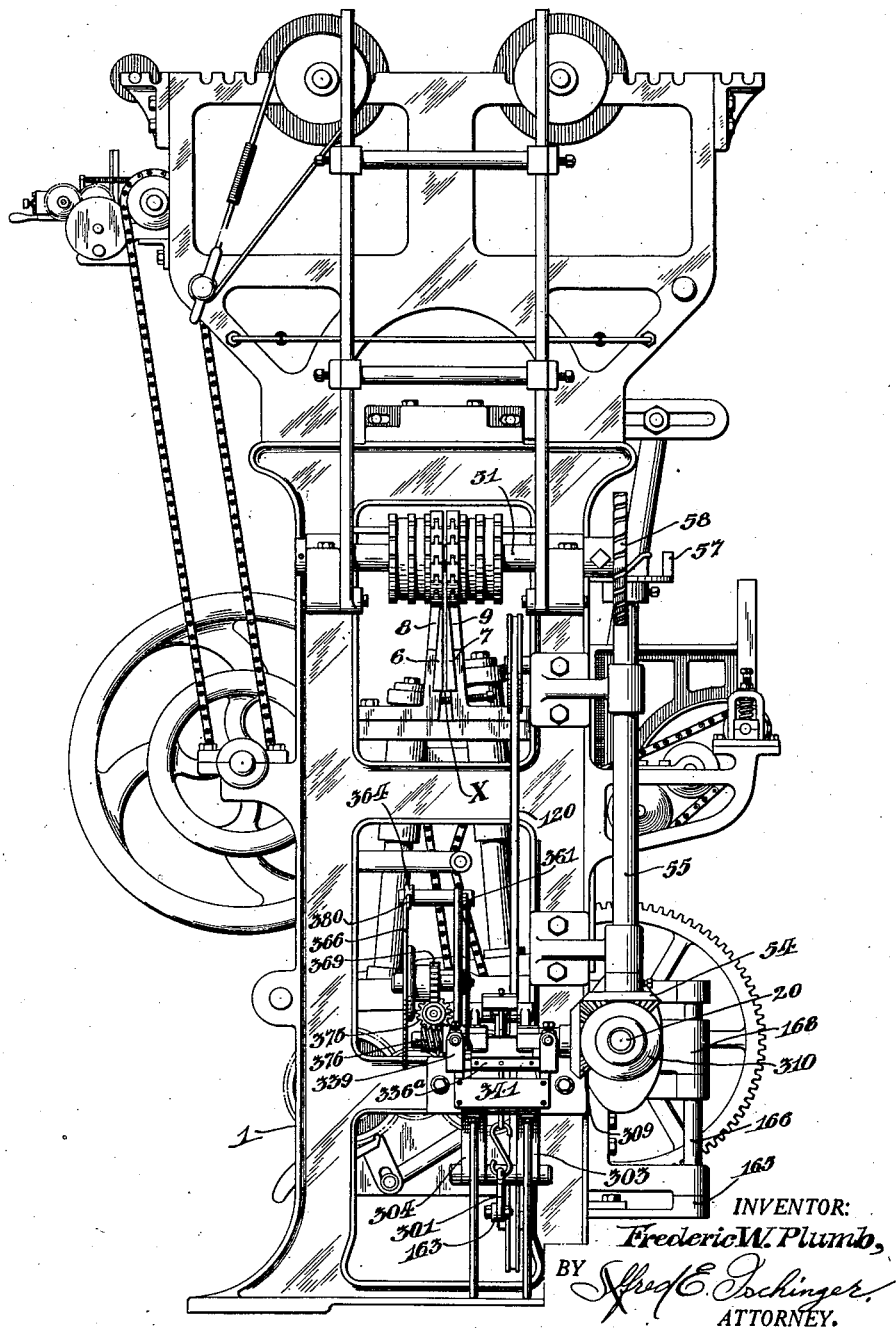

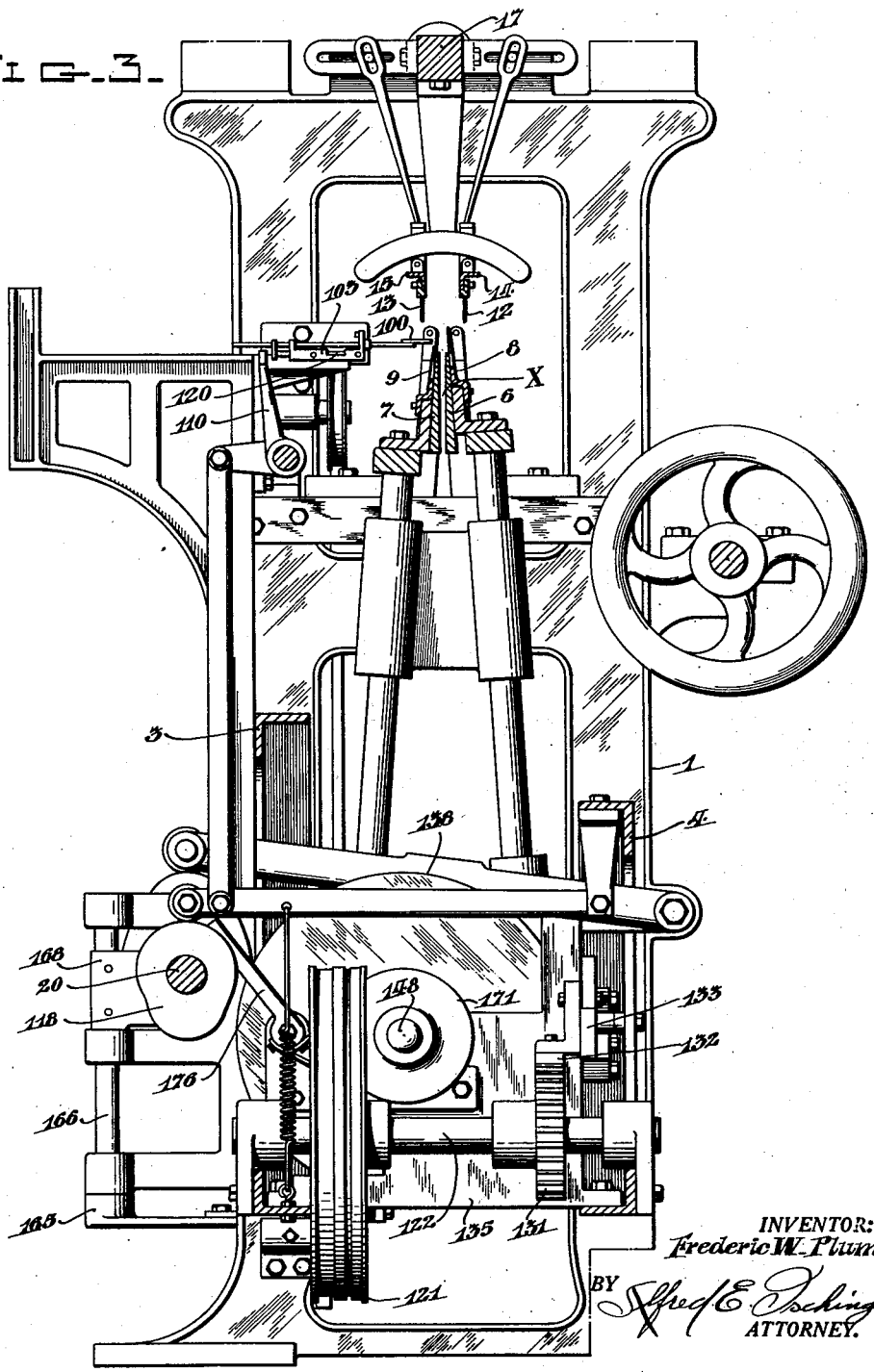

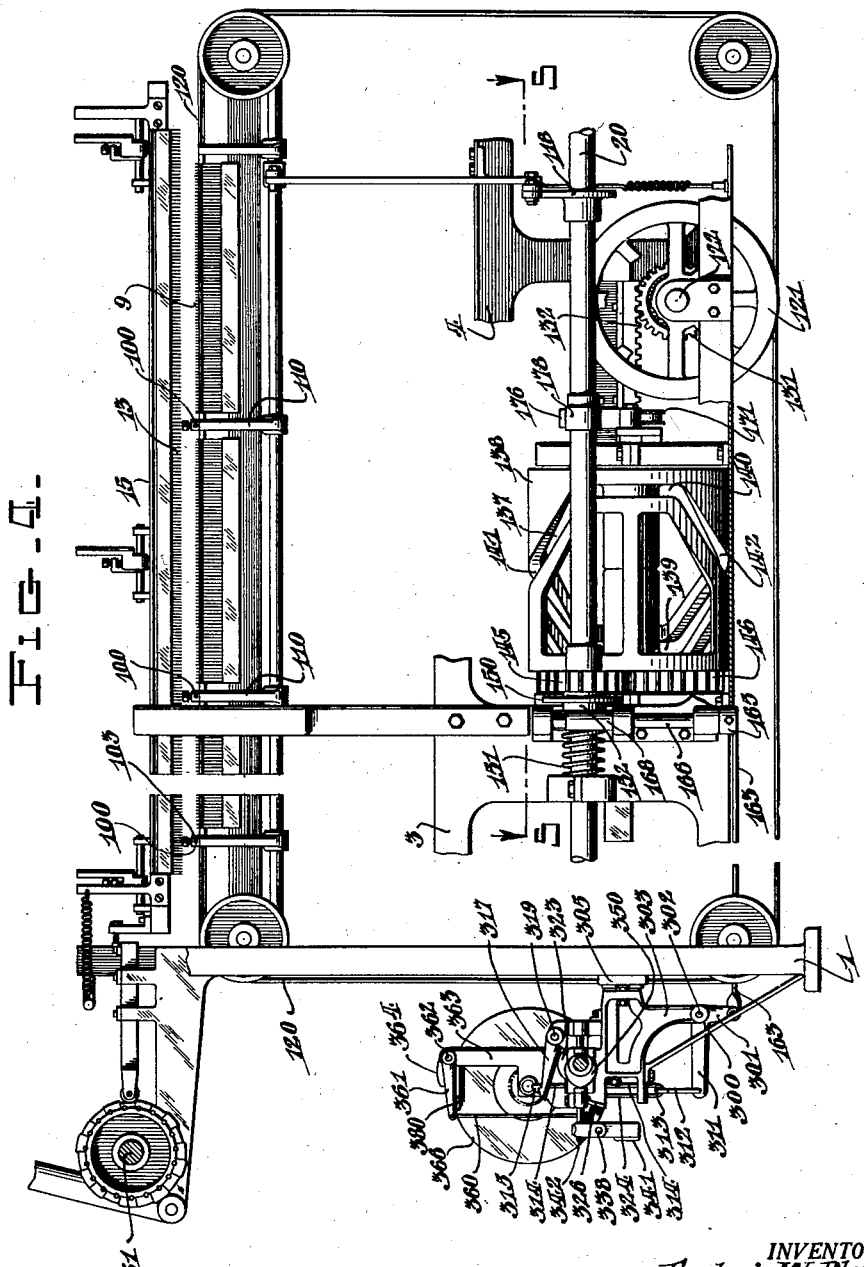

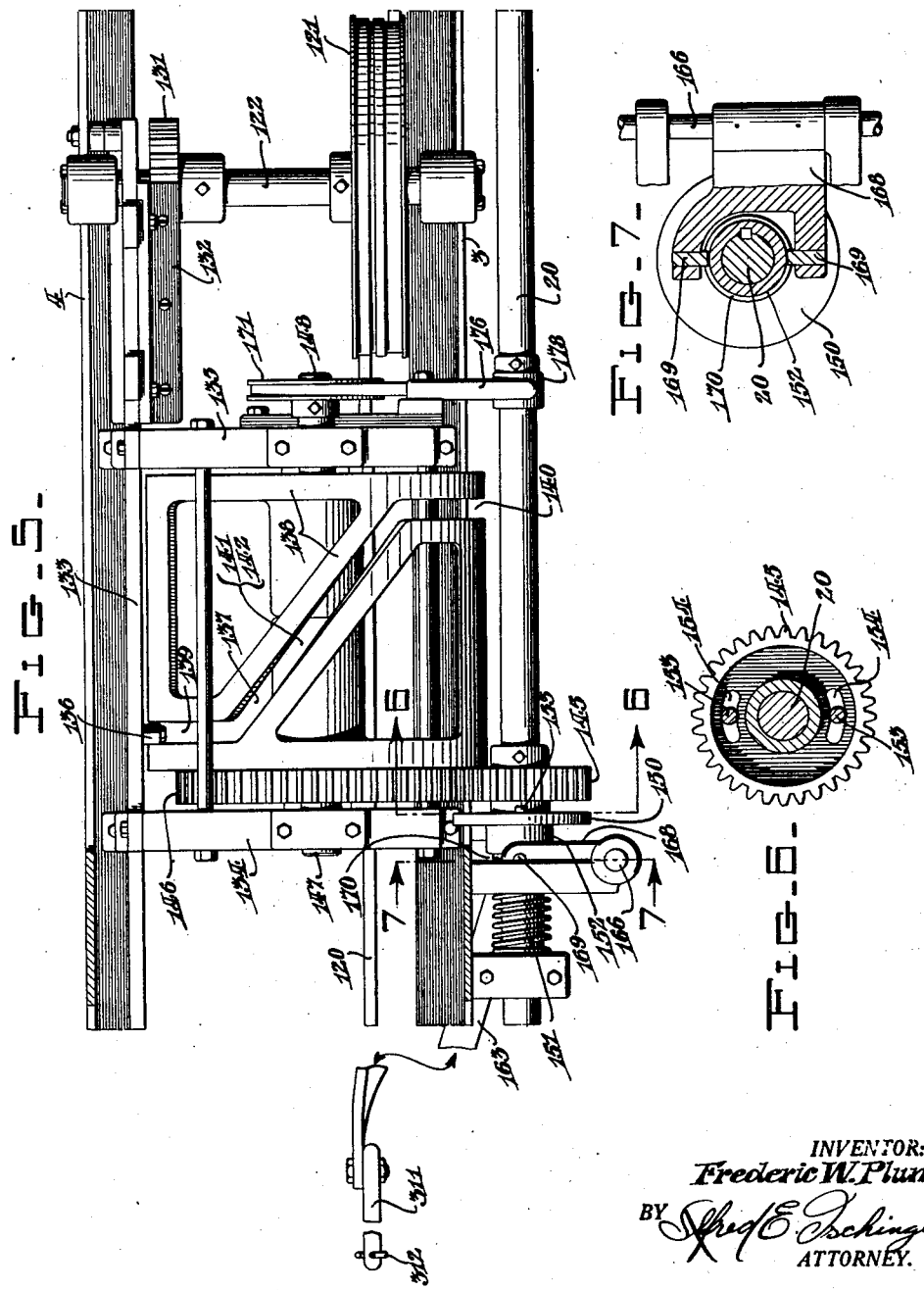

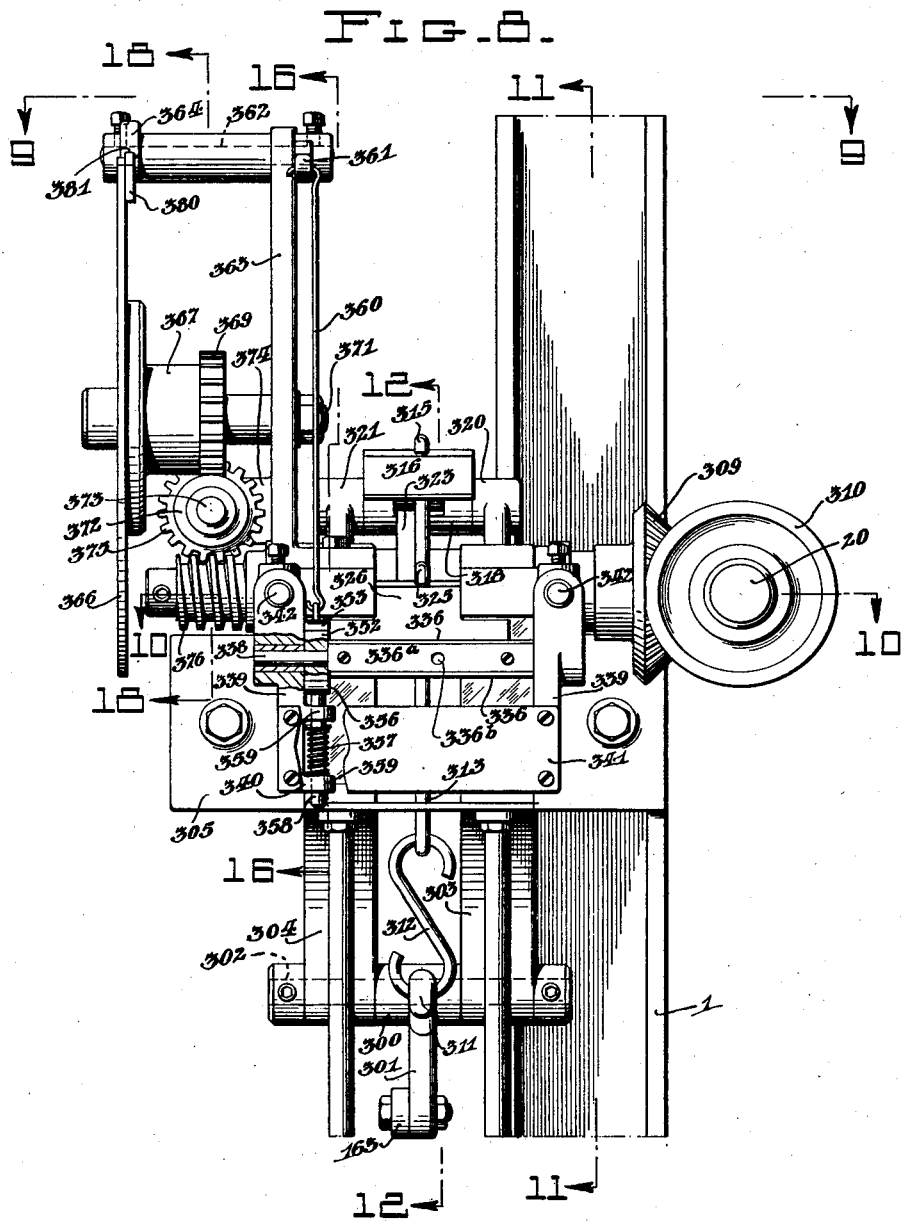

Dec. 1, 1936.                    F. W. PLUMB                    2,062,999
           MEANS FOR PRODUCING NOVEL KNITTED DOUBLE-FACED ELASTIC FABRICS
                   Filed July 28, 1933          14 Sheets-Sheet 7

INVENTOR:
Frederic W. Plumb,
BY  Fred E. Eschinger
                ATTORNEY.

Dec. 1, 1936.   F. W. PLUMB   2,062,999
MEANS FOR PRODUCING NOVEL KNITTED DOUBLE-FACED ELASTIC FABRICS
Filed July 28, 1933   14 Sheets-Sheet 8
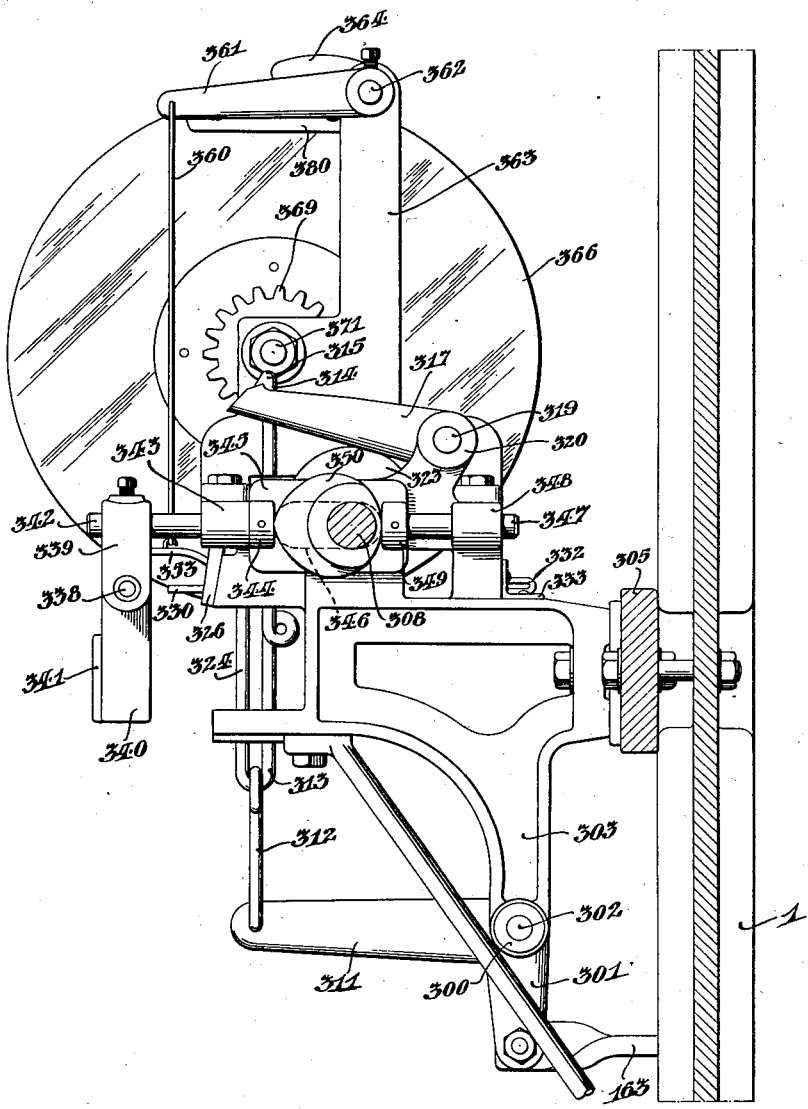
INVENTOR:
Frederic W. Plumb,
BY Alfred E. Ischinger
ATTORNEY.

Dec. 1, 1936.  F. W. PLUMB  2,062,999
MEANS FOR PRODUCING NOVEL KNITTED DOUBLE-FACED ELASTIC FABRICS
Filed July 28, 1933  14 Sheets-Sheet 9
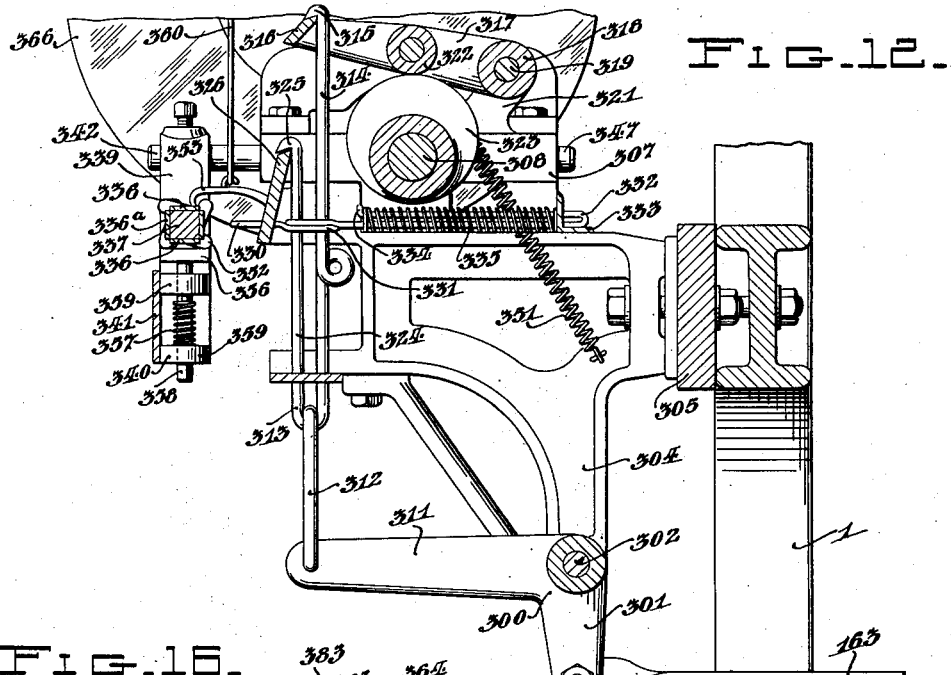
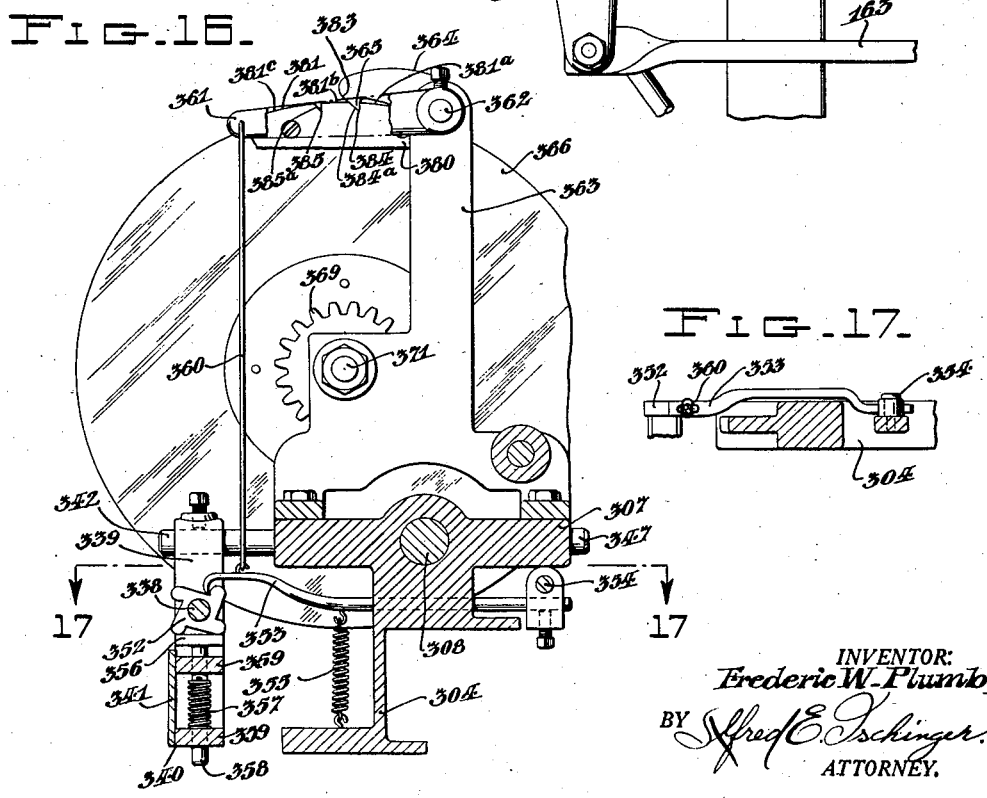
INVENTOR:
Frederic W. Plumb,
BY Alfred E. Ischinger
ATTORNEY.

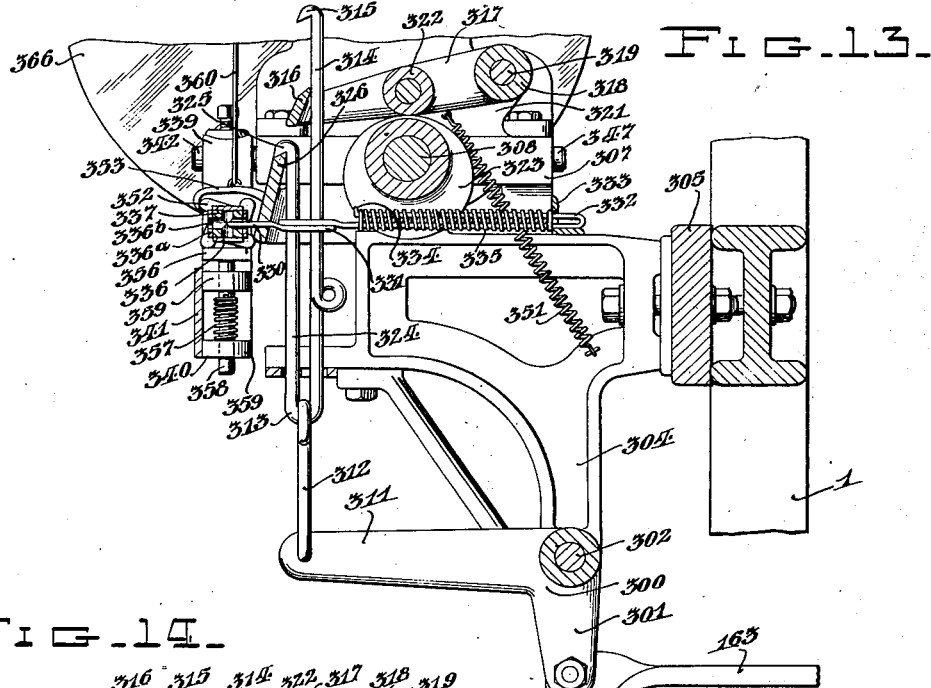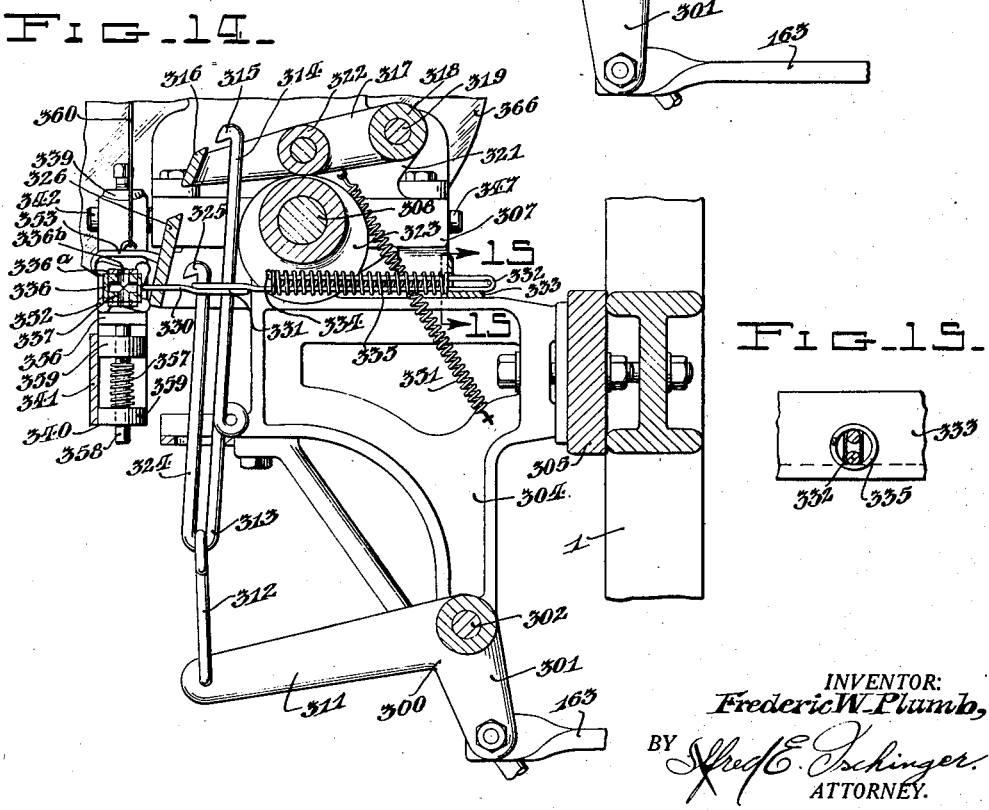

Dec. 1, 1936.  F. W. PLUMB  2,062,999
MEANS FOR PRODUCING NOVEL KNITTED DOUBLE-FACED ELASTIC FABRICS
Filed July 28, 1933  14 Sheets-Sheet 11

INVENTOR:
Frederic W. Plumb,
BY
ATTORNEY.

Dec. 1, 1936.                F. W. PLUMB                    2,062,999
MEANS FOR PRODUCING NOVEL KNITTED DOUBLE-FACED ELASTIC FABRICS
              Filed July 28, 1933         14 Sheets-Sheet 12
FIG.20.
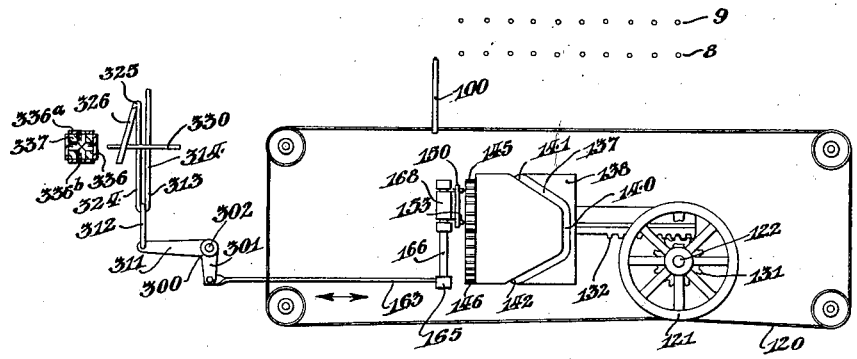
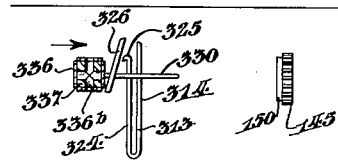
FIG.21.
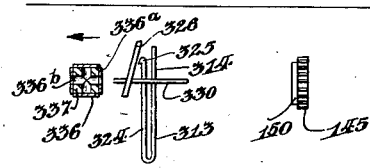
FIG.22.
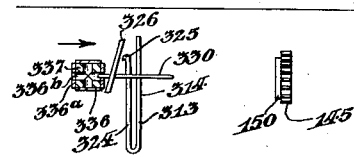
FIG.23.
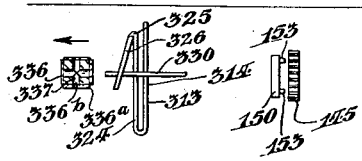
FIG.24.
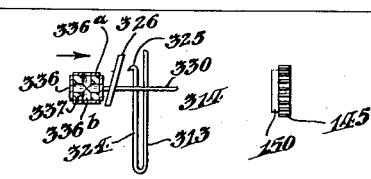
FIG.25.
INVENTOR:
Frederic W. Plumb,
BY Alfred E. Tschinger
ATTORNEY.

Dec. 1, 1936.  F. W. PLUMB  2,062,999
MEANS FOR PRODUCING NOVEL KNITTED DOUBLE-FACED ELASTIC FABRICS
Filed July 28, 1933   14 Sheets-Sheet 13

INVENTOR:
Frederic W. Plumb,
BY
ATTORNEY.

Dec. 1, 1936.  F. W. PLUMB  2,062,999
MEANS FOR PRODUCING NOVEL KNITTED DOUBLE-FACED ELASTIC FABRICS
Filed July 28, 1933  14 Sheets-Sheet 14
Fig. 29.
Fig. 27.
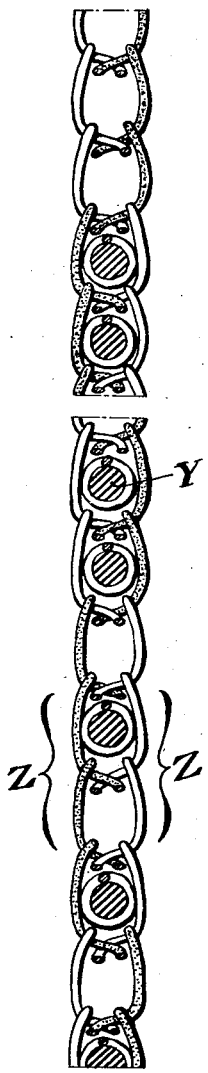
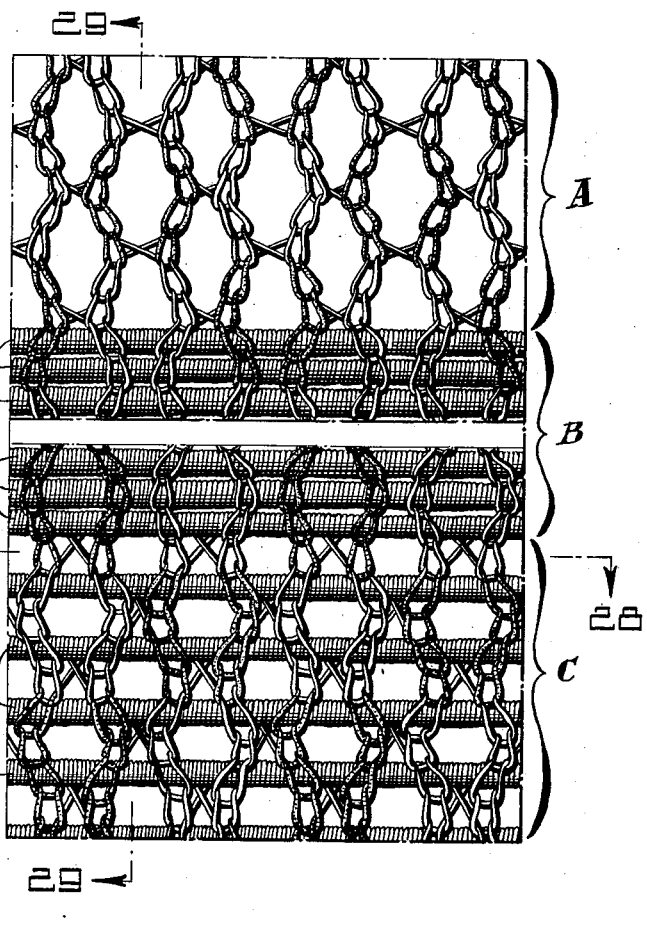
Fig. 28.
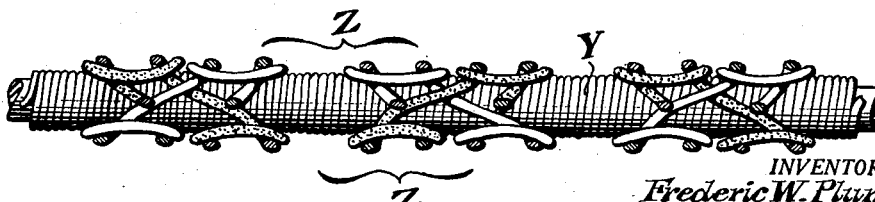
INVENTOR:
Frederic W. Plumb,
BY Alfred E. Ischinger
ATTORNEY.

Patented Dec. 1, 1936

2,062,999

UNITED STATES PATENT OFFICE 2,062,999

MEANS FOR PRODUCING NOVEL KNITTED DOUBLE-FACED ELASTIC FABRICS

Frederic W. Plumb, West Reading, Pa., assignor to Narrow Fabric Company, West Reading, Pa., a corporation of Pennsylvania Application July 28, 1933, Serial No. 682,612

9 Claims. (Cl. 66—84)

This invention relates to elastic knitted fabric and to mechanism by which such fabric may be produced.

The present invention constitutes improvements in and to the fabric and mechanism disclosed in the applicant's copending application Serial No. 650,756, filed January 9, 1933, Patent No. 2,053,877.

The fabric of the present application, like that of the copending application, is of the double smooth faced warp knit type having elastic weft threads disposed intermediate the two face planes of the fabric, as distinct from the prior art fabrics wherein elastic or other wefts are disposed on and project outwardly from the plane of one face of the fabric and produce a corded effect thereon.

The above noted prior application discloses a fabric wherein coursewise extending elastic wefts are disposed in uniformly spaced relation to each other throughout the length of the fabric, giving the fabric the same general appearance throughout the whole of the area thereof; and the mechanism disclosed in said copending application is arranged and operated to produce such effect in the fabric.

In the present case the appearance of the fabric varies and the fabric is structually different from the fabric of the copending application, in that a continuous sheet of the present fabric, as it comes from the warp knitting machine, includes a number of transversely extending areas, each of which differs in appearance and structurally from the area next adjacent thereto, such varying areas being repeated in a predetermined order longitudinally of the sheet; and the mechanism of the present case is arranged and operated to produce the fabric in accordance with the prescribed succession or order of the relatively differing areas. As an example, one order, that specifically disclosed in the present case, includes a relatively narrow coursewise extending area which is devoid of wefts. This non-weft area is followed by a relatively wider area wherein a plurality of wefts are disposed in relatively close parallel relation to each other. This close-weft area is followed by a still wider area wherein a plurality of wefts are disposed relatively farther apart. This wider spaced weft area is followed by another of the areas wherein the wefts are relatively close together, which completes one repeat of the fabric. Such repeats are reproduced successively throughout the length of the fabric and thereby constitute a sheet composed of a plurality of units which may be separated in such a manner that each unit will include one relatively wide body portion having the wefts relatively far apart, at each side of which will be a border portion having wefts relatively close together. The border portions of succeeding units are connected by the relatively narrow portions wherein there are no wefts whatsoever. These units are adapted to be separated one from the other by severing the fabric coursewise through the centers of the narrow non-weft areas.

The sheet of fabric may be of any desired width, in a coursewise direction, depending upon the number of needles employed in oppositely disposed groups of the two cooperating banks of needles by which the fabric sheet is produced.

The units noted are adaptable for use as elastic bandages in the production of ladies' undergarments, etc., in which case the raw cut edges produced by cutting the non-weft areas may be covered or obscured in any desired manner, such for example as by over-edge stitching or by folding and hemming in any suitable manner to tie and/or conceal the raw edges of the cut stitch wales.

The mechanism of the present case, in the greater part, is identical with the mechanism disclosed in the above noted copending application, varying therefrom principally by the provision of improved means for selectively operating the weft-laying mechanism, as will be fully disclosed hereinafter, reference being had to the accompanying drawings; of which:

Fig. 1 is a front elevation of the warp knitting machine illustrating the improved mechanism of the present case as applied thereto;

Fig. 2 is an enlarged left end elevation of the mechanism shown in Fig. 1;

Fig. 3 is a vertical cross-sectional view taken substantially as indicated by the arrows 3—3 in Fig. 1;

Fig. 4 is a front elevation, partly in section, illustrating, in detail, the mechanism employed for controlling the laying of the weft threads in the center of the fabric;

Fig. 5 is a sectional plan view taken on the line 5—5, Fig. 4;

Fig. 6 is a sectional elevation taken on the line 6—6, Fig. 5;

Fig. 7 is a sectional elevation taken on the line 7—7, Fig. 5;

Fig. 8 is an enlarged end elevation, partly in section, illustrating the mechanism for controlling the laying of the weft threads in the fabric by the mechanism shown in Figs. 4, 5, 6 and 7;

Fig. 11 is a sectional elevation taken on the line 11—11, Fig. 8;

Fig. 12 is a sectional elevation taken on the line 12—12, Fig. 8;

Figure 18:
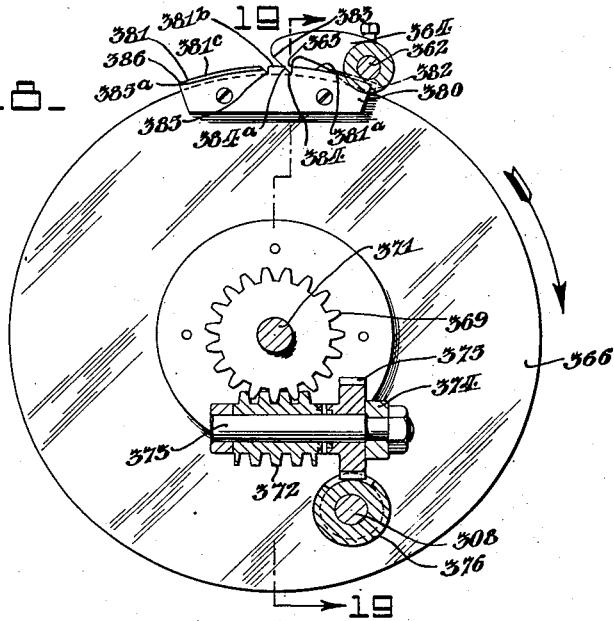
Figure 19:
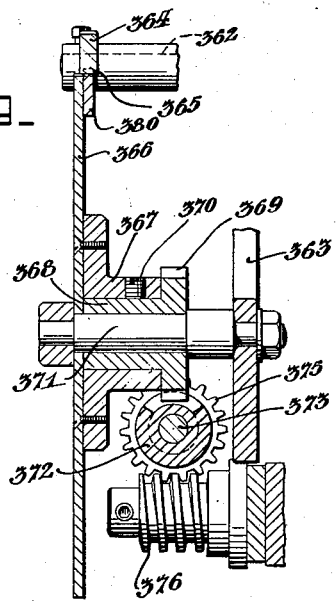
Figure 26:
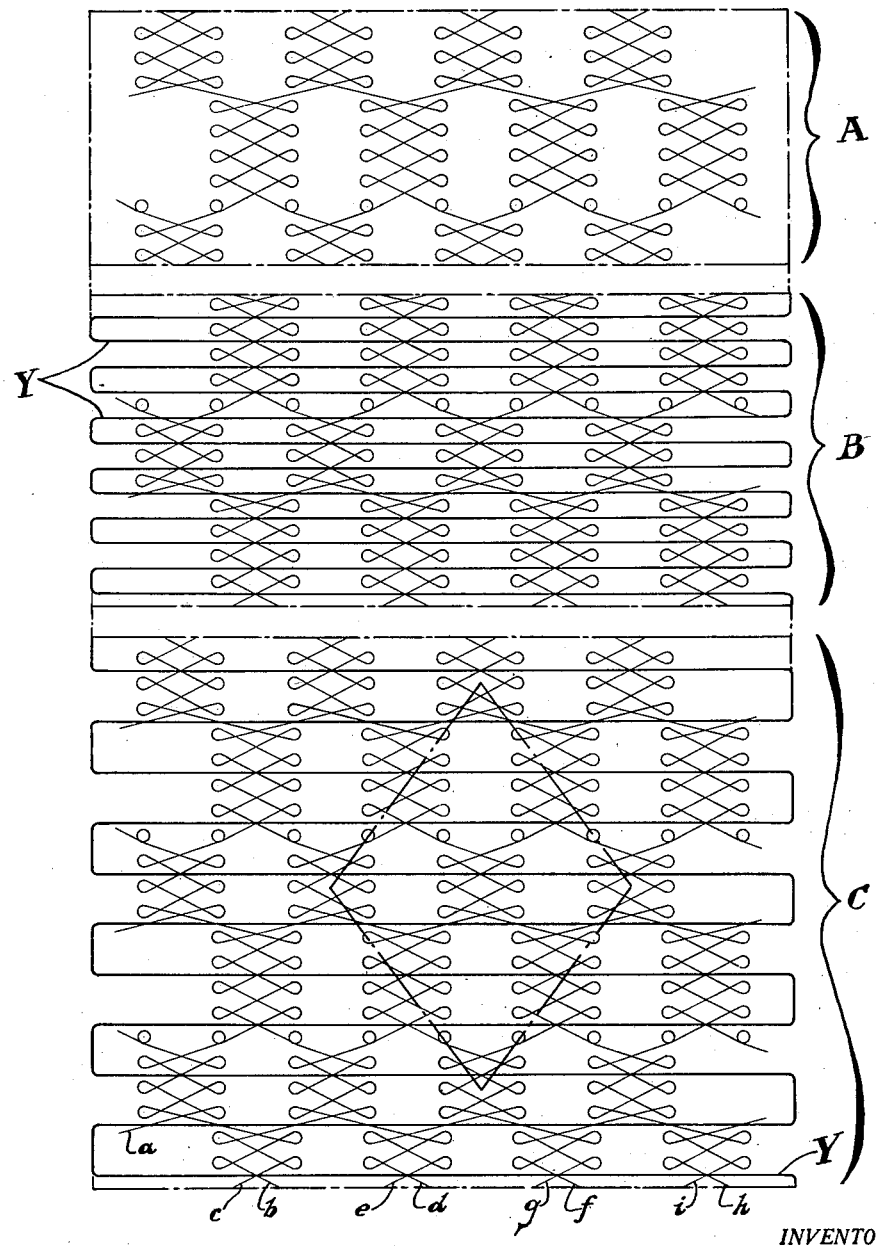

Figs. 13 and 14 respectively illustrate different positions of the elements of the mechanism illustrated in Fig. 12;

Fig. 15 is a detail sectional elevation taken on the line 15—15, Fig. 14;

Fig. 16 is a sectional elevation taken on the line 16—16, Fig. 8;

Fig. 17 is a fragmentary sectional plan view taken on the line 17—17, Fig. 16;

Fig. 18 is a sectional elevation taken on the line 18—18, Fig. 8;

Fig. 19 is a sectional elevation taken on the line 19—19, Fig. 18;

Fig. 20 is a diagrammatic view illustrating the relation between the two banks of needles, a weft-laying tube, the mechanism for operating the weft-laying tube, and the mechanism for controlling the operation of the thread-laying mechanism;

Figs. 21 to 25 inclusive illustrate various steps in the laying of a weft thread between the two banks of needles;

Fig. 26 is a diagrammatic view of a section of the fabric;

Fig. 27 is an enlarged diagrammatic view of the stitch formation in the section of the fabric diagrammatically illustrated in Fig. 26;

Fig. 28 is a transverse sectional view taken on the line 28—28, Fig. 27; and

Fig. 29 is a longitudinal sectional view taken on the line 29—29, Fig. 27.

The machine of the present case, like that disclosed in the above mentioned copending application, comprises two vertical substantially parallel banks of needles which respectively operate against relatively spaced vertically disposed work plates, the spacing of which provides a work slot through which the finished fabric passes from the needles to the take-up mechanism of the knitting machine.

The needles of each bank are secured, as a unit, to a needle bar and the two needle bars are operated coordinately, from a main cam shaft, to produce the stitches of the two opposite faces of the fabric respectively.

The needles are individually fed with separate warp knitting threads controlled separately by fingers individual to the needles. The thread fingers for one bank of needles are secured, as a unit, to one finger bar while those feeding the individual threads to the needles of the second bank are similarly secured to a second finger bar. The two finger bars are mounted in a manner to be rocked across the mouth of the work slot, from one bank of needles to the other bank of needles; and for lateral shogging movement relative to the two banks of needles which, together with the said rocking motion of the fingers, effects wrapping of the individual warp knitting threads around the needles, effecting a tying of the stitches of one face of the fabric to the stitches of the opposite face of the fabric and also effecting tying of the stitches of adjacent wales together at predetermined points throughout the length of the fabric.

During the knitting operations the weft threads are laid in predetermined stitch courses by a weft-laying tube which, when the needles and thread fingers are at rest, traverses the needles in a plane substantially parallel to, but spaced from, that of the work slot and carries a weft thread from one side of the fabric to the opposite side thereof, whereupon the tube is moved longitudinally, perpendicular to the plane of the work slot, from its needle-traversing plane to a position wherein the delivery end of the tube is disposed substantially in the plane of the work slot, whereby the weft thread, which during the traversing movement of the tube extends at an angle from the one edge of the fabric to the delivery end of the traveling tube, is laid in a plane coincident with that of the work slot, i. e. between the planes of the two banks of needles, whereupon the needles of the front bank are raised to a position corresponding to the position previously attained by the needles of the back bank, to hold the weft between the banks of needles while the weft-laying tube returns to its normal position in its above noted needle-traversing plane. The warp thread controlling fingers and the needles are then operated to produce a course of stitches which tie the weft thread in the center of the fabric.

The needle traversing movements of the thread-laying tube are effected by a cam cylinder which is driven by a pinion loosely mounted on the main cam shaft of the machine and which is adapted to be locked to the cam shaft, for actuating the cam cylinder, by a suitable clutch.

In the above noted copending application, the clutch of the weft-laying mechanism is controlled to effect uniformly repeated feed of the wefts, while the above noted rocking motions of said finger bars, coordinately with the shogging motions thereof, are effected by a cam or cams on the main cam shaft of the machine; whereas, in the present case the clutch of the weft-laying mechanism, which locks the cam cylinder driving pinion to the main cam shaft of the machine, is under selective control of improved mechanism forming the subject of the present invention and which will be fully disclosed hereinafter.

Referring to Fig. 1 of the drawings the left and right end frames of the machine are respectively indicated at 1 and 2, said frames being spaced apart and rigidly connected by a transversely extending front frame 3 and a corresponding back frame 4 (see Fig. 5).

The work plates are illustrated at 6 and 7, providing the work slot X therebetween, and the two banks of needles, respectively operating against said work plates, are illustrated at 8 and 9, (see Fig. 2). The fingers by which the individual work threads are fed to and wrapped around the needle of the banks 8 and 9 respectively are illustrated at 12 and 13, the finger bars being respectively illustrated at 14 and 15, and the shaft by which said fingers are rocked across the work slot X is illustrated at 17. The rock shaft 17 is illustrated, in Fig. 1, as being under control of a cam 50 mounted on one end of the main cam shaft 20, on which is also mounted the cams 44 and 45 by which the vertical knitting movements of the needles 8 and 9 are effected.

The pattern shaft by which the shogging motions of the fingers 12 and 13 are effected is illustrated at 51, the shaft being intermittently rotated by a modified Geneva movement comprising a notched wheel 56 secured to the pattern shaft 51. The notched wheel 56 is operated by a second wheel 57 on a vertical shaft 55, the latter being provided at its lower end with a bevel gear 54 meshing with a bevel wheel 53 secured to the main cam shaft 20. The cam shaft 20 is illustrated as being driven through a suitable train of gearing from and by an individual motor 25.

A series of the thread-laying tubes is illustrated at 100, 100 (see Fig. 4), said tubes each being carried by a suitable slide mounted in a carriage 103 which is secured to a steel tape or band 120. The tube-operating tape 120 passes around suitable idler pulleys and is secured to an operating drum 121, whereby the tape 120 with the carriages 103 is periodically reciprocated to effect the needle-traversing movements of the weft-laying tubes 100, and whereby the slides carrying the said tubes are placed in alignment with rocker arms 110 which are oscillated in timed relation with the needle-traversing movements of the tubes 100 by a cam 118 secured to the main cam shaft 20 to move the tubes from their needle-traversing plane to positions with their weft delivery ends coincident with the plane of the work slot X.

The tape drum 121 is secured to a shaft 122 rotatably mounted in the front and back frames 3 and 4 respectively (see Fig. 5), said shaft also being provided with a gear 131 which meshes with a rack 132 by which oscillation of the shaft 122 and the tape drum 121 is effected to provide the reciprocatory movement of the tube-operating tape 120.

The rack 132 is secured to a slide bar 133 which is slidably mounted in cross frames 134 and 135 carried at their opposite ends by the front and rear frames 3 and 4 respectively.

Rotatably mounted on the slide bar 133 is a roller 136 which rides in a continuous cam groove 137 formed in a tube-traversing cylinder or drum 138, said cam groove comprising circumferentially extending dwell portions 139 and 140 disposed in substantially parallel transverse planes adjacent the opposite ends respectively of the drum 138 and which are connected at their opposite ends respectively by angularly or spirally disposed roller activating portions 141 and 142 respectively, whereby rotation of the cam cylinder 138 will effect the longitudinal reciprocation of the slide bar 133 and which through the mechanism above noted provides a corresponding reciprocation of the tube tape 120.

The cam cylinder or traversing drum 138 is provided with trunnions 147 and 148 which are rotatably mounted in bearings carried by the cross frames 134 and 135 respectively. On the trunnion 148 is a brake drum 171 which is periodically applied to effect stopping of the drum 138, by a lever 176 arranged to be engaged by an operating element 178 mounted on the cam shaft 20.

On the traversing drum 138 is a gear 146 which meshes with a pinion 145 loosely mounted on the cam shaft 20 and provided with arcuate slots 154 which are adapted to receive pins 153 which project laterally from a clutch disc 150 (see Figs. 5 and 6). The clutch disc 150 is constantly urged toward the pinion 145 by a spring 151, for locking the pinion 145 to the cam shaft 20 to effect rotation of the traversing drum 138.

The ratio of the gears 145 and 146 is such that for each revolution of the cam shaft 20 the traversing drum 138 receives but one-half revolution, whereby the roller 136 on the slide bar 133 moves from one of the end grooves 139 or 140, as the case may be, through one of the angular grooves 141 or 142, to effect movement of the tube-actuating tape 120 in one direction, to carry the weft-laying tubes 100 through one needle-traversing movement from one side of a group of needles served thereby to the opposite side of said group of needles.

One complete revolution of the cam shaft 20 effects the formation of one course of stitches by the needles 8 and 9 and the one-half revolution of the traversing drum 138 effects the laying of a weft thread in each course of stitches produced, as long as the clutch pins 153 remain in engagement with the slots 154 of the drum driving pinion 145.

The present invention relates to improved mechanism for controlling the engagement and disengagement of the clutch comprising the disc 150 and gear 145, whereby the clutch may be left in engagement during the formation of a predetermined number of successively formed courses of stitches, or whereby the clutch may be engaged and disengaged to lay weft threads in alternate stitch courses, or whereby the clutch may be held in a disengaged position during the knitting of a number of successively formed courses wherein no weft threads will be present.

The clutch disc 150 is provided with a hub 152 (see Figs. 5 and 7) having a circumferential groove 170 into which project pins 169 respectively carried by arms of a yoke lever 168. The yoke lever 168 is secured to a vertical shaft 166 on the lower end of which is secured a lever 165. The lever 165 is connected by a link 163 to one arm 301 of a bell-crank lever 300, which is rotatably mounted on a shaft 302 and disposed between a pair of brackets 303 and 304 in which the opposite ends of said shaft 302 are respectively mounted.

Figure 9:
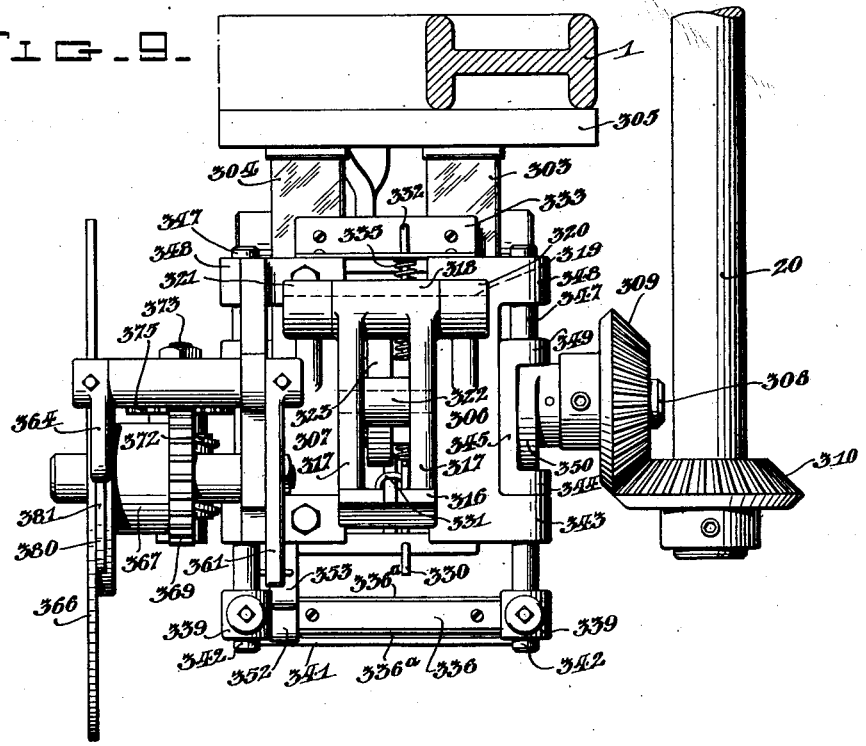
Fig. 9 is a sectional plan view taken on the line 9—9, Fig. 8.

The brackets 303 and 304 (see Figs. 8 and 9) are secured to a plate 305 which in turn is secured to the end frame 1 of the machine. In or on the brackets 303 and 304 respectively are formed or carried bearings 306 and 307, which rotatably support a shaft 308 (see Fig. 10) on which is secured a bevel gear 309. The bevel gear 309 meshes with a bevel gear 310 secured to the cam shaft 20.

The second arm 311 of the bell-crank lever 300 (see Figs. 4, 12, 13 and 14) is connected by a link 312 to the lower end of a U-shaped clutch-controlling element 313, by which the bell-crank lever 300 is rocked in a direction to disengage the clutch 145—150, and by which the elements 145—150 of said clutch are held in a disengaged relation against the action of the spring 151, which later, as above noted, tends to effect interlocking engagement of the clutch elements at all times.

For disengaging the said clutch (see Fig. 12), the longer leg 314 of the U-shaped element 313 is provided with a hooked end 315 arranged, under predetermined conditions, to be engaged by a blade 316 which is secured to the outer ends of a pair of arms 317—317 having a common hub 318 rotatably mounted on a rod 319 secured at its opposite ends in bearings 320 and 321 (see Fig. 9) carried by the brackets 303 and 304 respectively.

Intermediate the arms 317, 317, between the hub 318 and the blade 316, is a freely rotatable roller 322 (see Figs. 9, 12, 13 and 14) which rides the peripheral surface of a cam or eccentric disc 323. The eccentric cam 323 is secured to the shaft 308 intermediate the brackets 303 and 304 (see Fig. 10). The cam 323, due to the ratio of the gears 309 and 310, receives one complete revolution for each complete revolution of the cam shaft 20, therefore, for each course of stitches produced by the needles 8 and 9 as effected by each revolution of the cam shaft 20, the blade 316 is raised once, and, should the hook 315 be disposed in a position in the path of the blade 316, the said blade will engage the hook 315, thereby raising the element 313 and consequently rocking the bell-crank lever 300 in a direction to disengage the clutch 145—150.

The second leg 324 of the U-shaped element 313 is provided at its upper end with a hook 325, which, when the said element 313 is raised under the conditions and in the manner above noted, moves with a snap action to position over a fixed blade 326 which extends across the space between the brackets 303—304 and is rigidly secured at its opposite ends respectively to said brackets. Snapping of the hook 325 over the fixed blade 326 retains the element 313 in a raised position, to which it is moved by the swinging of the arms 317, consequently maintaining the clutch 145—150 in a disengaged position.

The clutch-controlling element 313 is adapted to be rocked or flexed to move the hook 325 off the retaining blade 326 and to move the second hook 315 out of the path of the movable blade 316, by mechanism hereinafter described. The U-shaped element 313 is under direct control of a selector needle 330 (see Figs. 12, 13 and 14) which is provided with a loop 331 embracing the two legs 314 and 324 of the U-shaped element 313. The one end of the needle 330 is slidably mounted in and projects through and beyond the fixed blade 326. The opposite end of said needle is bent backwardly upon itself, parallel to the body of the needle, (see Fig. 14) and is slidably mounted in one flange of an angle bar 333 which is secured at its opposite ends to the brackets 303 and 304 respectively.

The extreme end of the reverse portion 332 of the needle 330 is provided with a lip or shoulder 334 between which and the inner face of the bar 333 is mounted a spring 335 which encircles the parallel portions of the needle 330 and tends at all times to move the said needle longitudinally in a direction whereby the hooks 315 and 325 are carried to the positions above noted, intersecting the planes of the blades 316 and 326 respectively, for engagement with said blades.

Longitudinal movement of the needle 330 in an opposite direction to release the hook 325 from the fixed blade 326 and to move the hook 315 out of the path of the movable blade 316 is effected, in the present instance, by a series of cards or plates 336, 336a, which are disposed on, around, and in engagement with, the four sides or faces of a cross-sectionally rectangular selector cylinder 337.

The selector cylinder 337 is provided, in the present instance, with trunnions 338 and 338 which are rotatably mounted respectively in vertically extending legs 339 of a U-shaped frame 340 (see Fig. 8) formed by said legs being integrally connected by a plate 341. The legs 339 of the U-shaped frame 340 (see Fig. 10) are mounted respectively on the outer ends of rods 342, 342 which are slidably mounted in bearings 343, 343 formed respectively on the brackets 303 and 304. The inner ends of the rods 342, 342 are rigidly mounted in bearings 344, 344 formed on plates 345, 345 which are slidably mounted on the bracket 303, 304 respectively, and which are respectively provided with elongated slots 346, 346 through which the shaft 308 passes.

In axial alignment with the rods 342, 342 are rods 347, 347 which are slidably mounted in bearings 348, 348, respectively formed on the brackets 303 and 304. The inner ends of the rods 347, 347 are rigidly mounted in bearings or lugs 349, 349 formed on the plates 345, 345 at the opposite side of the shaft 308 to that occupied by the lugs 344, 344 in which the inner ends of the rods 342, 342 are rigidly secured.

Figure 10:
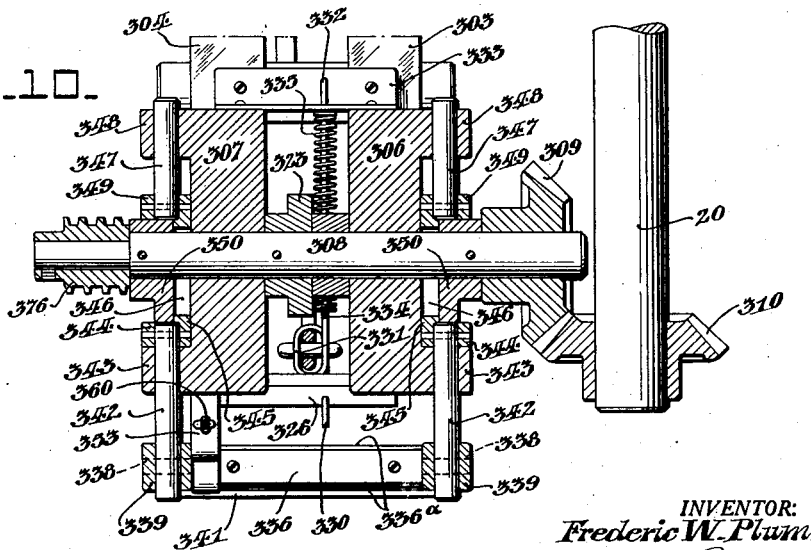
Fig. 10 is a sectional plan view taken on the line 10—10, Fig. 8.

Secured to the shaft 308 adjacent to the outer side of each of the brackets 303 and 304 and between the lugs 344 and 349 of each of the plates 345 is a heart-shaped cam 350, (see Figs. 10 and 11, the peripheral surface of each of which is engaged at diametrically opposite points by the lugs 344 and 349 whereby rotation of the said heart-shaped cams, by a corresponding rotation of the shaft 308, effects reciprocation of the plates 345 and consequently the rods 342, whereby the rectangular cylinder 337 is reciprocated laterally toward and away from the projecting end of the selector needle 330.

In the present instance a pair of the plates 336 which are respectively disposed on a pair of opposite faces of the cylinder 337 are blank, while the plates 336a disposed respectively on the second pair of oppositely disposed faces of said cylinder are provided with perforations 336b. During an inward movement of the cylinder 337 toward the projecting end of the selector needle 330, should one of the blank plates 336 occupy a position in line with the needle 330, as shown in Figs. 12 and 14, said needle will be engaged thereby and moved longitudinally to disengage the hook 325 of the clutch control element 313 from the fixed blade 326, as shown in Fig. 14, whereby the spring 151 will immediately effect engagement of the clutch 145—150, whereby the tube-traversing cam cylinder 138 will effect a traversing movement of the weft-laying tubes 100 in the course of stitches about to be produced by the cooperative action of the needles 8 and 9 and the fingers 12 and 13 by which the knitting threads are fed to said needles.

As the shaft 308 rotates in unison with the cam shaft 20 the eccentric 323 will raise the movable blade 316 without engaging the hook 315 of the clutch-controlling element 313 and at the same time the heart-shaped cams 350 will move the selector cylinder 337 outwardly, thereby moving the plate 336 away from the selector needle 330 and permitting the spring 335 to move the said needle outwardly, which in turn moves the clutch-controlling element 313 accordingly.

During the outward movement of the selector cylinder 337 the said cylinder is adapted to be turned to the extent of 90°, bringing another of the plates on the said surfaces of the cylinder 337 into line with the selector needle 330.

Continued rotation of the shaft 308 moves the selector cylinder 337 in an opposite direction, that is, toward the selector needle 330.

Should the plate then in alignment with the needle 330 be provided with one of the perforations 336b the projecting end of the selector needle 330 will enter such opening and a corresponding opening in the cylinder 337, (as shown in Fig. 13) without causing any rearward movement of the clutch-controlling element 313 and the hooks 315 and 325 thereof.

During this last said movement of the selector cylinder 337 the movable blade 316 is lowered by a spring 351 which swings the arms 317 about their pivot 319, consequently the said movable blade will be lowered to a position below the hook 315 of the clutch-controlling element 313 and the said hook 315 will immediately snap over the beveled upper edge of the blade 316 under the influence of the spring 335, whereby, as the shaft 308 continues to rotate, the arms 317 will again be rocked upwardly by the eccentric 323 which will raise the blade 316 and the clutch-controlling element 313 by reason of the engagement of the hook 315 with the upwardly moving blade 316.

Upward movement of the clutch-controlling element 313 rocks the bell-crank lever 300 about its pivot and through the link 163 disengages the pins 153 of the clutch disc 150 from the slots 154 in the gear 145, the hook 325 of the clutch-controlling element 313 at the same time snapping over the upper beveled edge of the fixed blade 326 (as shown in Fig. 12), thereby holding the clutch elements in disengaged relationship to each other. At the same time the element 178 on the cam shaft 20 operates to apply the brake to the brake drum 171 on the trunnion 148 of the traversing drum 138, whereby said drum is brought to and held in a fixed position.

The turning of the selector cylinder 337, as the said cylinder moves outwardly in the manner above noted, is effected by means of a star or ratchet wheel 352, which is secured to one of the trunnions 338 of said selector cylinder 337, being engaged by a hook or pawl 353 which is pivotally mounted at 354 to the bracket 304, said pawl being held in contact with the ratchet wheel 352 at all times by a spring 355, as shown in Fig. 16.

The cylinder 337 is maintained in the position to which it is turned, by the hook or pawl 353, by means of a spring-pressed plunger (see Fig. 16) having a head 356 simultaneously engaging two of the points of the star or ratchet wheel under pressure of a spring 357, which latter encircles the stem 358 of said spring-pressed plunger, said stem being slidably mounted in lugs 359, 359 formed on one of the legs 339 of the U-shaped frame 340.

The hook 353, by which the selector cylinder 337 is rotated, is under control of mechanism by which it may be left in contact with the star wheel 352, to rotate the selector cylinder 337, 90° for each reciprocation of the U-shaped frame 340, or by which the said hook may be disengaged from and held out of contact with the star wheel 352, to permit the said selector cylinder to remain stationary relative to the U-shaped frame 340 so that the operation or non-operation of the selector needle 330, as the case may be depending upon whether one of the blank plates 336 or one of the perforated plates 336a is in line with the said selector needle, will be successively carried out during successive reciprocations of the U-shaped frame 340 and the relatively stationary selector cylinder 337 carried thereby.

In the present instance the cylinder-operating hook 353 is connected by a link 360 to the outer end of an arm 361 (see Figs. 11 and 16) which is secured to one end of a short shaft 362. The shaft 362 is rotatably mounted in a bracket 363 which forms an extension of or is secured to the bracket 304. Also secured to the shaft 362 is an arm 364 (see Fig. 18) which is provided with a sharp edged projection 365 adapted to ride the peripheral surface of a control disc 366.

The control disc 366 (see Fig. 19) is provided with a hub 367 which is adjustably mounted on a hub 368 of a gear wheel 369, a set screw 370 being provided to lock the two hubs 367 and 368 together as a unit. The gear wheel 369 is rotatably mounted on a stud 371 secured in and projecting from the bracket 363. The gear or worm wheel 369 meshes with a worm 372 which is rotatably mounted on a stud 373 secured in a lug 374 which projects laterally from the bracket 363. Secured to the form 372 is a worm wheel 375 which meshes with a worm 376 secured to the shaft 308.

The gearing between the shaft 308 and the disc 366 is such that the said disc receives one complete revolution for a relatively large number of revolutions of the shaft 308 and the cam shaft 20, and in the present instance the ratio is such that the disc 366 receives one complete revolution during the knitting of the total number of courses of stitches included in each repeat in or unit of the fabric as above referred to.

As long as the sharp edge of the projection 365 on the arm 364 is in engagement with the peripheral edge of the disc 366 the selector cylinder 337 will be turned 90° upon each reciprocation of the frame 340 as each course of stitches is produced and with the arrangement disclosed, wherein the blank plates 336 alternate with the perforated plates 336a on the selector cylinder 337, the clutch 145—150 will be engaged during the formation of alternate courses of stitches and disengaged during the formation of the intermediate courses so that the weft-laying tubes 100 will be actuated to lay a weft thread in alternate courses of the stitches produced.

In order to provide portions of the fabric with weft threads in each succeeding course, the disc 366 is provided with a segmental plate 380. The peripheral surface 381 of the segmental plate 380 is of a greater radius than the peripheral surface of the disc 366, whereby, as the disc 366 rotates in the direction of the arrow in Fig. 18, the leading corner 382 of the segmental plate 380 will ride under an inclined surface 383 formed on the arm 364, causing the sharp pointed edge of the projection 365 of said lever 364 to ride up on to the higher peripheral surface 381 of the said segmental plate 380. In the present case, this operation takes place at a time when one of the blank plates 336 is in line with the selector needle 330. The rocking of the arm 364 by the segmental plate 380 raises the hook or pawl 353 out of engagement with the star or ratchet wheel 352 which controls the rotation of the selector cylinder 337, consequently the blank plate 336 remains in line with the selector needle 330 and upon each reciprocation of the said selector needle the hook 325 of the clutch-controlling element 313 is released from the fixed holding blade 326, as a result of which the clutch 145—150 remains engaged continuously and thereby effects continuous rotation of the traversing drum 138 which in turn effects needle-traversing movements of the weft-laying tubes 100 continuously one traversing movement for each of a number of successive courses of stitches, whereby the weft is laid in each of said successive courses of stitches. Such continuous operation of the weft-laying tubes continues as long as the point of the projection 365 rides the portion 381a of the peripheral surface 381 of the segmental plate 380.

The peripheral surface 381 of the plate 380 is provided with an indentation 384 which, as the disc 366 rotates continuously, provides for a momentary dropping of the arm 361 which permits the pawl or hook 353 to drop into engagement with the star or ratchet wheel 352 of the selector cylinder 337 as said cylinder moves outwardly during one of its successive reciprocations.

Dropping of the pawl 353 into engagement with the star wheel 352, as the cylinder 337 moves outwardly, causes the said cylinder to be rotated to the extent of 90° which brings one of the perforated plates 336a into alignment with the selector needle 330. As soon as the cylinder 337 is rotated in this manner the pawl 353 is again lifted out of engagement with the star wheel 352 by the inclined surface 383 of the arm 364 riding an inclined surface 384a which lifts the sharp edge of the projection 365 of the arm 364 out of the indentation 384, whereupon said sharp edge rides a portion 381b of the peripheral surface 381 of the plate 380.

With the perforated plate 336a in line with the needle 330 the projecting end of the needle 330 enters the perforation 336b at each reciprocation of the cylinder 337, consequently the needle 330 is not moved longitudinally, as a result of which the hook 325 of the clutch-controlling element 313 remains in engagement with the fixed blade 326 and holds the clutch elements 145—150 in disengaged relation to each other during the formation of a number of successive stitch courses, determined by the circumferential length of the portion 381b of the peripheral surface of the segmental plate 380, whereby the weft-laying tubes 100 do not traverse the needles during the formation of the said predetermined number of courses of stitches, consequently these courses are devoid of weft threads.

As the disc 366 continues to rotate the sharp edge of the projection 365 of the arm 364 drops into a second indentation 385 formed in the surface 381 of the plate 380, whereupon the arm 364 again drops the pawl 353 into engagement with the star wheel 352 as the selector cylinder 337 moves outwardly, whereby the cylinder 337 is given another 90° rotation bringing the second blank plate 336 into line with the selector needle 330 as the said cylinder 337 again moves inwardly. The outer end of the selector needle 330 is then engaged by the blank plate 336 causing the hook 325 to be released from the fixed blade 326 and permitting the clutch 145—150 to be reengaged to begin the laying of weft threads in each of a second series of successively formed stitch courses as determined by the circumferential length of the portion 381c of the peripheral surface of the segmental plate 380 on to which the sharp edge 365 is carried by riding up the inclined surface 385a out of the indentation 385, which causes the arm 364 to pick the pawl 353 and to hold said pawl out of engagement with the star wheel 352, which leaves the selector cylinder 337 in a fixed position relative to reciprocating U-shaped frame 340.

Continued rotation of the disc 366 brings the trailing edge or corner 386 of the segmental plate 380 under the sharp edge 365 of the arm 364, whereupon said edge of the arm drops off the edge 386 of the plate 380 into engagement with the peripheral surface of the disc 366, which again drops the pawl 353 into engagement with the star wheel 352 so that for each reciprocation of the U-shaped frame 340 the selector cylinder 337 carried thereby will receive a 90° turn, whereby the plates 336 and 336a are alternately brought into line with the selector needle 330 causing the clutch 145—150 to be engaged and disengaged during the formation of alternate courses respectively, whereby weft threads are laid in the alternate courses in the manner above described.

Fig. 20 diagrammatically illustrates the clutch as being disengaged with the weft-laying tube stopped at one side of a needle group composed of oppositely disposed needles of the two banks 8 and 9 with the selector cylinder 337 in an outer position.

Fig. 21 diagrammatically illustrates the selector cylinder 337 as having moved inwardly with a blank disc 336 in line with the selector needle 330, whereby the said selector needle is moved longitudinally releasing the hook 325 from the fixed blade 326, permitting the clutch 145—150 to be engaged, by which one of the needle-traversing movements of the weft-laying tube 100 is started.

Fig. 22 illustrates the selector cylinder 337 as moving outwardly, releasing the selector needle 330 during the said traversing movement of the weft-laying tube 100 as the clutch 145—150 remains engaged, the said cylinder 337 during this outward movement receiving the 90° rotation bringing one of the perforated plates 336a into line with the needle 330.

Fig. 23 illustrates the cylinder 337 as having completed its inward movement whereby the needle 330 has entered the perforation 336b in the plate 336a as the thread-laying tube 100 completes the said needle-traversing movement thereof, the clutch 145—150 still remaining engaged.

Fig. 24 illustrates the cylinder 337 as having completed a second outward movement and a 90° rotation as effected thereby.

During this movement of the cylinder 337 the movable blade 316 has engaged the hook 315 of the clutch-controlling element 313 as said blade moves upwardly, whereby the clutch-controlling element 313 has been correspondingly moved and the clutch element 150 thereby released from the clutch element 145, leaving the tube 100 in quiescent state at the opposite side of the group of needles from which it started, as illustrated in Fig. 20.

Fig. 25 illustrates the selector cylinder 337 after having moved inwardly with a blank plate 336 in line with the needle 330 whereby the hook 325 of the clutch-controlling element 313 has again been released from the fixed blade 326 permitting the clutch element 150 to engage the clutch element 145, whereby the tube 100 is started on the needle-traversing movement in a direction opposite to that illustrated in Figs. 21, 22 and 23.

Fig. 26 diagrammatically illustrates the manner in which individual warp knitting threads a, b, c, d, e, f, g, h, i, etc. are wrapped around the individual needles of the banks 8 and 9 by the combined shogging and rocking motions of the finger-carrying bars 14 and 15, in a manner similar to that disclosed in the said copending application, by which said threads are tied together at predetermined intervals to produce an area A in the fabric devoid of weft threads.

The area A is followed by the production of an area B wherein the weft thread Y is laid in each of the successively knit courses of stitches formed by the threads a, b, c. etc., as above described.

The area B is followed by an area C wherein weft threads Y are included in alternate courses of stitches formed by the individual threads a, b, c, etc., in the manner noted above.

Fig. 27 illustrates a portion of the fabric corresponding to the diagrammatic illustration of Fig. 25 and in addition thereto shows the actual stitch formation of which the fabric is composed, Figs. 28 and 29 further illustrating the manner in which the weft threads Y are disposed intermediate the opposite relatively smooth faces Z, Z of the fabric.

The actual knitting operations for producing the fabric shown in Figs. 26, 27, 28 and 29, being substantially the same as those followed in the knitting of the fabric disclosed in the said co-pending application, have not been described in detail in the present case.

Obviously, the inserting of the weft threads in any desired order, not necessarily repeated in the manner above noted, may be accomplished by the elimination of the means including the disc 366 for raising the cylinder-rotating pawl 353 out of contact with the star wheel 352 of the selecting cylinder 337 and the provision of a large or small number of plates 336 and 336a linked together as a chain with the perforated plates 336a distributed as desired among the blank plates 336 for successive presentation to the selector needle 330 as the selector cylinder 337 is successively reciprocated and turned 90 degrees for each reciprocation, whereby a weft thread Y may be introduced where desired in any course or number of courses equally or unequally spaced throughout the length of the fabric.

Of course, the improvements specifically shown and described can be changed and modified in various ways without departing from the invention herein disclosed and hereinafter claimed.

I claim:

1. In combination, means to be controlled, control mechanism for said means, including elements cooperating to maintain the control mechanism in predetermined position relative to said controlled means and to move the control mechanism into another position relative to the controlled means, a needle-like selector, a member for cooperation with said selector having perforate and imperforate surfaces, said selector and said member being reciprocable relative to each other in the direction of the needle-like selector, said selector and said member being movable relative to each other in another direction to present said perforate and imperforate surfaces to the selector, means for actuating said member to effect said other movement, a cam, means cooperating between said actuating means and the cam for selectively preventing actuation of said member, driving means, means for operating the cam from the driving means at a lower speed than the driving means, means operated by the driving means for effecting said relative reciprocation between the needle-like selector and said member, and means actuating one of said elements in timed relation to the reciprocation of said member and the relatively slow movement of the cam.

2. In combination, holding elements, a fixed detent for cooperation with one of the holding elements, a relatively movable detent for cooperation with another of said elements, a needle-like selector, a member for cooperation with said selector having perforate and imperforate surfaces, said selector and said member being reciprocable relative to each other in the direction of the needle-like selector, said selector and said member being movable relative to each other in another direction to present said perforate and imperforate surfaces to the selector, means for actuating said member to effect said other movement, a cam, means cooperating between said actuating means and the cam for selectively preventing actuation of said member, driving means, means for operating the cam from the driving means at a lower speed than the driving means, means operated by the driving means for effecting said relative reciprocation, and means actuating the movable detent in timed relation to the reciprocation of said member and the relatively slow movement of the cam.

3. In combination, holding elements, a fixed detent for cooperation with one of the holding elements, a relatively movable detent for cooperation with another of said elements, a needle-like selector, a member reciprocable in the direction of the selector and movable in another direction to present perforate and imperforate surfaces to the selector, means for actuating said member by said other movement to present said surfaces to the selector, a cam, means cooperating between said actuating means and the cam for selectively preventing actuation of said member, driving means, means for operating the cam from the driving means at a lower speed than the driving means, means operated by the driving means for reciprocating said member, and means actuating the movable detent in timed relation to the reciprocations of said member and the relatively slow movement of the cam.

4. In combination, holding elements, a fixed detent for cooperation with one of the holding elements, a relatively movable detent for cooperation with another of said elements, a needle-like selector, a rotatable member reciprocable laterally to its axis presenting perforate and imperforate surfaces to the selector, means for actuating the rotatable member to present said surfaces to the selector, a cam, means cooperating between said actuating means and the cam for selectively preventing actuation of the rotatable member, driving means, means for operating the cam from the driving means at a lower speed than the driving means, means operated by the driving means for reciprocating the rotatable member, and means actuating the movable detent in timed relation to the reciprocations of the rotatable member and the relatively slow movement of the cam.

5. In combination, holding elements, a fixed detent for cooperation with one of the holding elements, a relatively movable detent for cooperation with another of said elements, a needle-like selector, a rotatable member reciprocable laterally to its axis presenting perforate and imperforate surfaces to the selector, means for rotating the rotatable member during its lateral reciprocation to present said surfaces to the selector, a cam, means cooperating between the means for rotating the rotatable member and the cam for selectively preventing rotation of the rotatable member during predetermined of its lateral reciprocations, a shaft, means for driving the cam from the shaft at a lower speed than the shaft, means operated by the shaft for reciprocating the rotatable member, and means actuating the movable detent in timed relation to the reciprocations of the rotatable member and the relatively slow movement of the cam.

6. In combination, holding elements, a fixed detent for cooperation with one of the holding elements, a relatively movable detent for cooperation with another of said elements, a needle-like selector, a rotatable member reciprocable laterally to its axis presenting perforate and imperforate surfaces to the selector, means for rotating the rotatable member during its lateral reciprocation to present said surfaces to the selector, a cam, means cooperating between the means for rotating the rotatable member and the cam for selectively preventing rotation of the rotatable member during predetermined of its lateral reciprocations, a continuously rotatable shaft, means for driving the cam from the shaft at a lower speed than the shaft, means on the shaft actuating the movable detent in timed relation to the reciprocations of the rotatable member and the relatively slow movement of the cam.

7. In combination, means to be controlled, control mechanism for said means, comprising holding elements, a fixed detent for cooperation with one of the holding elements to maintain the control mechanism in predetermined position relative to said controlled means, a relatively movable detent for cooperation with another of said elements to move the control mechanism into another position relative to the controlled means, a needle-like selector operatively connected to the control mechanism, a rotatable member reciprocable laterally to its rotative axis presenting perforate and imperforate surfaces to the selector, means for rotating the rotatable member step by step during its lateral reciprocation to present said surfaces to the selector, a member having high and low cam surfaces, means cooperating between the means for rotating the rotatable member and the cam surface member for selectively preventing rotation of the rotatable member during predetermined of its lateral reciprocation, a continuously rotatable shaft, means for driving the cam-surface member from the shaft at a predetermined lower speed than the shaft, means carried by the shaft for reciprocating the rotatable member once for each revolution of the shaft, and means on the shaft for actuating the movable detent once for each revolution of the shaft in timed relation to the reciprocations of the rotatable member and the relatively slow movement of the cam surface member.

8. The combination of a clutch, control means for the clutch comprising holding elements, a fixed detent for cooperation with one of the holding elements to maintain the control means in clutch-releasing position, a relatively movable detent for cooperation with another of said elements to move the control means into clutch-releasing position, a needle-like selector operatively connected to the control means, a rotatable member reciprocable laterally to its rotative axis presenting perforate and imperforate surfaces to the selector, means for rotating the rotatable member step by step during its lateral reciprocation to present said surfaces to the selector, a member having high and low cam surfaces, means cooperating between the means for rotating the rotatable member and the cam-surface member for selectively preventing rotation of the rotatable member during predetermined of its lateral reciprocations, a continuously rotatable shaft, means for driving the cam-surface member from the shaft at a predetermined lower speed than the shaft, means carried by the shaft for reciprocating the rotatable member once for each revolution of the shaft, and means on the shaft for actuating the movable detent once for each revolution of the shaft in timed relation to the reciprocations of the rotatable member and the relatively slow movement of the cam-surface member.

9. The combination of a clutch, a control element for said clutch and comprising a pair of hooks, a fixed blade adapted to be engaged by one of said hooks to hold said control element in a clutch-releasing position, a relatively movable blade for engaging the second of said hooks to move said control element into said clutch-releasing position, a selector needle operatively connected to said control element, a cylinder presenting perforate and imperforate control surfaces in alignment with said needle, pawl and ratchet mechanism normally rotating said cylinder step by step during reciprocations of the cylinder to present said surfaces successively to the needle, a wheel having relatively high and low cam surfaces, means operatively connected to said pawl and riding the cam surfaces of said wheel for selectively disengaging the pawl from the ratchet to prevent rotation of the cylinder during predetermined reciprocations of the cylinder, a continuously rotating shaft, means for driving said wheel from said shaft at a predetermined relatively lower speed than said shaft, means carried by said shaft for reciprocating said cylinder once for each revolution of said shaft, and means on said shaft for actuating said movable blade once for each revolution of the shaft in timed relation to the reciprocations of the cylinder and the relatively slow advancing movements of said wheel.

FREDERIC W. PLUMB.